(12) United States Patent
Simons

(10) Patent No.: US 7,905,062 B2
(45) Date of Patent: Mar. 15, 2011

(54) PERFECT PERCH ROOFING SYSTEM

(76) Inventor: Stephen Llewellyn Simons, Pembroke (BM)

( * ) Notice: Subject to any disclaimer, the term of this patent is extended or adjusted under 35 U.S.C. 154(b) by 174 days.

(21) Appl. No.: 12/316,218

(22) Filed: Dec. 10, 2008

(65) Prior Publication Data

US 2010/0139177 A1     Jun. 10, 2010

(51) Int. Cl.
  *E04B 7/04* (2006.01)
(52) U.S. Cl. .............. 52/92.1; 52/90.1; 52/93.2; 52/94; 52/169.5; 52/302.1
(58) Field of Classification Search .......... 52/90.1, 52/92.1, 93.2, 94, 96, 292, 302.1, 302.3, 52/169.5, 309.8, 309.14, 168, 263, 274, 283, 52/293.3, 295, 634
  See application file for complete search history.

(56) References Cited

U.S. PATENT DOCUMENTS

| | | | | |
|---|---|---|---|---|
| 1,448,244 A * | 3/1923 | Wilson | ................ | 52/92.1 |
| 1,458,498 A * | 6/1923 | Piel | ................ | 52/90.1 |
| 1,609,573 A * | 12/1926 | Priest et al. | ................ | 52/204.1 |
| 2,261,510 A * | 11/1941 | Atcheson | ................ | 52/97 |
| 2,690,072 A * | 9/1954 | Reed | ................ | 52/11 |
| 2,849,966 A * | 9/1958 | Alexis | ................ | 52/11 |
| 2,851,873 A * | 9/1958 | Wheeler-Nicholson | ........ | 52/262 |
| 3,283,693 A * | 11/1966 | Howell | ................ | 454/186 |
| 3,693,305 A * | 9/1972 | Kneisel | ................ | 52/276 |
| 3,897,667 A * | 8/1975 | Turek | ................ | 52/546 |
| 3,979,863 A * | 9/1976 | Hurley et al. | ................ | 52/92.1 |
| 4,122,639 A * | 10/1978 | Barrell | ................ | 52/92.1 |
| 4,386,136 A * | 5/1983 | Kaufmann | ................ | 428/451 |
| 4,547,331 A * | 10/1985 | Batstra | ................ | 264/333 |
| 4,584,810 A * | 4/1986 | Hill | ................ | 52/652.1 |
| 4,625,484 A * | 12/1986 | Oboler | ................ | 52/251 |
| 4,759,160 A * | 7/1988 | Fischer | ................ | 52/91.2 |
| 4,788,801 A | 12/1988 | Jones | | |
| 4,852,311 A * | 8/1989 | Lea | ................ | 52/91.3 |
| 4,934,404 A * | 6/1990 | DeStefano | ................ | 137/357 |
| 5,022,209 A * | 6/1991 | Kimura | ................ | 52/646 |
| 5,245,803 A * | 9/1993 | Haag | ................ | 52/90.1 |
| 5,297,374 A * | 3/1994 | Himes | ................ | 52/641 |
| 5,342,138 A * | 8/1994 | Saito et al. | ................ | 403/189 |
| 5,355,640 A * | 10/1994 | Frye | ................ | 52/23 |
| 5,359,816 A * | 11/1994 | Iacouides | ................ | 52/274 |
| 5,409,549 A | 4/1995 | Mori | | |
| 5,457,917 A * | 10/1995 | Palmersten | ................ | 52/91.3 |
| 5,570,549 A * | 11/1996 | Lung et al. | ................ | 52/295 |
| 5,661,929 A * | 9/1997 | Ross | ................ | 52/58 |
| 5,685,114 A * | 11/1997 | Tanaka | ................ | 52/271 |
| 5,761,862 A * | 6/1998 | Hendershot et al. | ........ | 52/271 |
| 6,279,293 B1 * | 8/2001 | Ojala | ................ | 52/794.1 |
| 6,357,183 B1 * | 3/2002 | Smith | ................ | 52/15 |
| 6,363,674 B1 * | 4/2002 | Carver | ................ | 52/309.8 |
| 6,401,412 B1 * | 6/2002 | Cooper | ................ | 52/302.1 |
| 6,401,417 B1 * | 6/2002 | Leblang | ................ | 52/481.1 |
| 6,408,594 B1 * | 6/2002 | Porter | ................ | 52/794.1 |
| 6,415,580 B2 * | 7/2002 | Ojala | ................ | 52/794.1 |
| 6,588,171 B2 * | 7/2003 | Pryor et al. | ................ | 52/793.1 |
| 6,598,356 B1 * | 7/2003 | Sells | ................ | 52/90.1 |
| 6,772,569 B2 * | 8/2004 | Bennett et al. | ................ | 52/592.1 |
| 6,796,325 B1 * | 9/2004 | Courier | ................ | 137/357 |
| 7,249,443 B2 * | 7/2007 | Faulkner et al. | ................ | 52/411 |
| 7,475,517 B2 * | 1/2009 | Kawai et al. | ................ | 52/702 |

(Continued)

*Primary Examiner* — Brian E Glessner
*Assistant Examiner* — Joshua Ihezie

(57) ABSTRACT

A roofing assembly includes an uppermost stainless steel cover. The cover has an upper surface and a lower surface. The roofing assembly has a reinforced foam base, rafters and a ridge board. The ridge board supports the cover and the base. Cement board panels have upper surfaces adhered to the foam base.

6 Claims, 7 Drawing Sheets

U.S. PATENT DOCUMENTS

| | | | |
|---|---|---|---|
| 7,716,877 B2 * | 5/2010 | Gilstrap et al. | 52/92.2 |
| 2001/0008143 A1 * | 7/2001 | Sasaoka et al. | 136/244 |
| 2003/0014928 A1 * | 1/2003 | Kerney | 52/90.1 |
| 2003/0145550 A1 * | 8/2003 | Bennett et al. | 52/592.1 |
| 2005/0011142 A1 * | 1/2005 | Higgins | 52/90.1 |
| 2005/0184000 A1 * | 8/2005 | Jowett | 210/220 |
| 2005/0246972 A1 * | 11/2005 | Polumbus et al. | 52/90.1 |
| 2005/0284038 A1 * | 12/2005 | Jenkins | 52/90.1 |
| 2008/0193712 A1 * | 8/2008 | Desjardins | 428/119 |
| 2008/0236058 A1 * | 10/2008 | Antonie | 52/90.1 |
| 2009/0000210 A1 * | 1/2009 | Barnett | 52/12 |

* cited by examiner

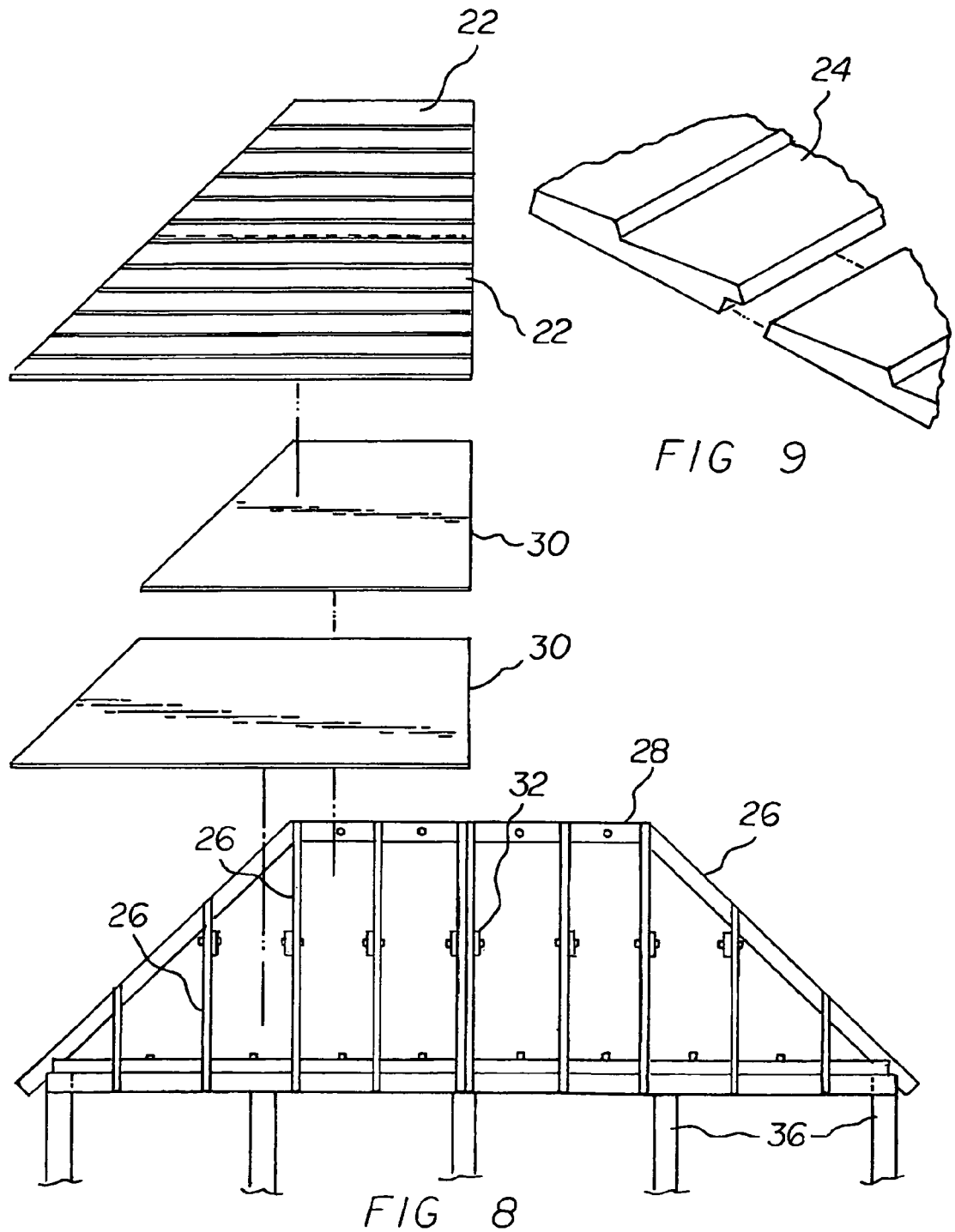

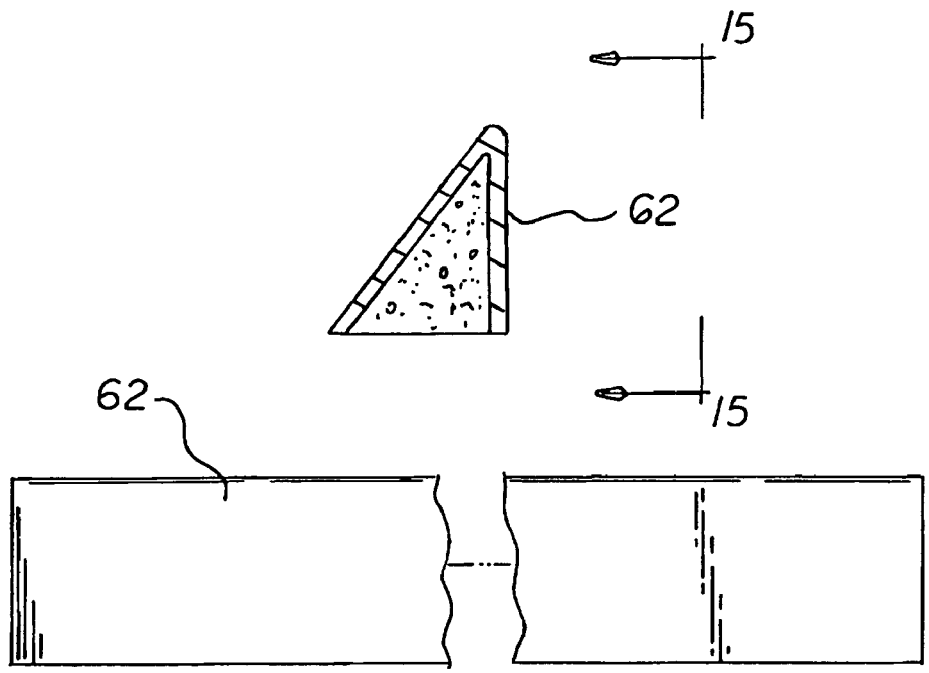
FIG 14
FIG 15
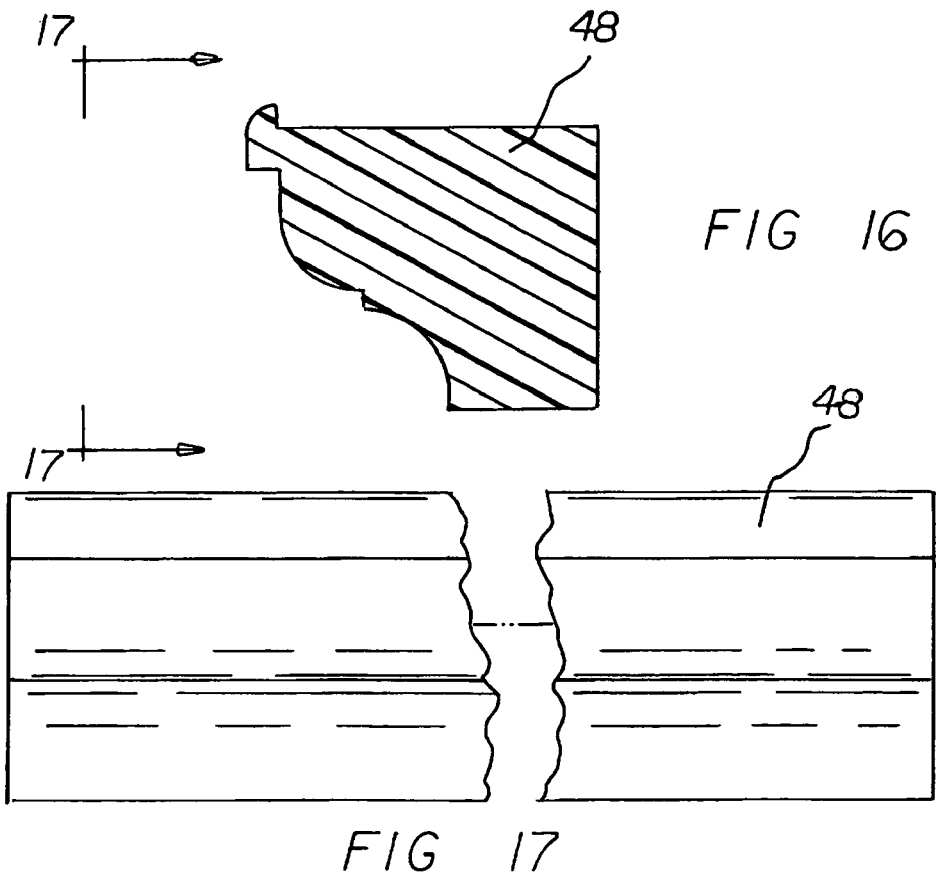
FIG 16
FIG 17

PERFECT PERCH ROOFING SYSTEM

BACKGROUND OF THE INVENTION

1. Field of the Invention

The present invention relates to a perfect perch roofing system and more particularly pertains to protecting a building from all weather conditions and for filling a storage tank with rain water, the protecting and filling being accomplished in a safe, convenient, durable and economical manner.

2. Description of the Prior Art

The use of water management systems of known designs and configurations is known in the prior art. More specifically, water management systems of known designs and configurations previously devised and utilized for the purpose of directing water through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,788,801 issued Dec. 6, 1988 to Jones relates to a Ridge System. U.S. Pat. No. 4,934,404 issued Jun. 19, 1990 to DeStefano relates to a Water Management System. Lastly, U.S. Pat. No. 5,409,549 issued Apr. 25, 1995 to Mori relates to a Solar Cell Module Panel.

While these devices fulfill their respective, particular objectives and requirements, the aforementioned patents do not describe a perfect perch roofing system that allows for protecting a building from all weather conditions and for filling a storage tank with rain water, the protecting and filling being accomplished in a safe, convenient, durable and economical manner.

In this respect, the perfect perch roofing system according to the present invention substantially departs from the conventional concepts and designs of the prior art, and in doing so provides an apparatus primarily developed for the purpose of protecting a building from all weather conditions and for filling a storage tank with rain water, the protecting and filling being accomplished in a safe, convenient, durable and economical manner.

Therefore, it can be appreciated that there exists a continuing need for a new and improved perfect perch roofing system which can be used for protecting a building from all weather conditions and for filling a storage tank with rain water, the protecting and filling being accomplished in a safe, convenient, durable and economical manner. In this regard, the present invention substantially fulfills this need.

SUMMARY OF THE INVENTION

In view of the foregoing disadvantages inherent in the known types of water management systems of known designs and configurations now present in the prior art, the present invention provides an improved perfect perch roofing system. As such, the general purpose of the present invention, which will be described subsequently in greater detail, is to provide a new and improved perfect perch roofing system and method which has all the advantages of the prior art and none of the disadvantages.

To attain this, the present invention essentially comprises a perfect perch roofing system. First provided is a concrete slab. The concrete slab is positionable on the ground in a horizontal plane.

A roofing assembly is provided. The roofing assembly is positioned above the slab. The roofing assembly includes an uppermost stainless steel cover. The cover has an upper surface. The upper surface is coated with a non-skid coating. The cover has a lower surface. The roofing assembly includes a reinforced Styrofoam® base. Styrofoam is a trademark of The Dow Chemical Company, a coproration of Delaware having a place of business in Midland, Mich. Styrofoam relates to a multicellular expanded synthetic resinous material. The roofing assembly includes rafters. The roofing assembly includes a ridge board. The ridge board supports the cover and the base. The roofing assembly includes Plycem® cement board panels. Plycem is a trademark of Plycem Systems Holding, Inc., a corporation of Panama, having a place of business in Panama City, Panama. Plycem is a trademark directed to fiber cement building panels. The panels have upper surfaces. The upper surfaces are adhered to the Styrofoam base. The roofing assembly also includes doubling attaching members. The members are provided between rafters and ridge boards. In this manner fabrication and assembly are facilitated at separate sites.

An enclosing structure is provided. The enclosing structure has laterally spaced, vertically disposed concrete columns. Each column has a lower end. The lower end is coupled to the slab. Each column has an upper end. The upper end is coupled to the roofing assembly. The enclosing structure includes walls. The walls are supported by the columns. The enclosing structure includes peripheral footers. The footers couple the columns at their lower ends adjacent to the slab. The enclosing structure includes a concrete peripheral belt course. The belt course is coupled to the upper ends of the columns. The enclosing structure includes upstanding cast-in-place bolts. The bolts extend upwardly from the belt course. The enclosing structure includes a wooden wall plate. The wooden wall plate has several vertical apertures. The apertures receive the bolts. In this manner securement is provided. Stainless steel screws are provided. The stainless steel screws secure the rafters to the wall plate. Eave molding is provided. The eave molding is fabricated of Styrofoam. The eave molding is secured between the walls of the enclosing structure and the roofing assembly.

Provided last is a rain water sub-system. The rain water sub-system includes a rain water storage tank. The tank is positioned beneath the slab. The tank is fabricated of Styrofoam. The tank has a stainless steel casing. The tank includes a stainless steel cover. The tank has a divider. The divider divides the tank into two regions. A debris receiving sump is provided in each region. A self priming pump is provided. The self priming pump removes rainwater from the tank. Rain water glides are provided. The rain water glides are provided on the roof. Down pipes are provided. The down pipes have filters. The filters direct rain water from the roof to the tank.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved perfect perch roofing system which has all of the advantages of the prior art water management systems of known designs and configurations and none of the disadvantages.

It is another object of the present invention to provide a new and improved perfect perch roofing system which may be easily and efficiently manufactured and marketed.

It is further object of the present invention to provide a new and improved perfect perch roofing system which is of durable and reliable constructions.

An even further object of the present invention is to provide a new and improved perfect perch roofing system which is susceptible of a low cost of manufacture with regard to both materials and labor, and which accordingly is then susceptible of low prices of sale to the consuming public, thereby making such perfect perch roofing system economically available to the buying public.

Even still another object of the present invention is to provide a perfect perch roofing system for protecting a building from all weather conditions and for filling a storage tank with rain water, the protecting and filling being accomplished in a safe, convenient, durable and economical manner.

Lastly, it is an object of the present invention to provide a new and improved perfect perch roofing system. A roofing assembly includes an uppermost stainless steel cover. The cover has an upper surface. The cover has a lower surface. The roofing assembly has a reinforced foam base, rafters and a ridge board. The ridge board supports the cover and the foam base. Cement board panels have upper surfaces adhered to the foam base.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is an exploded perspective view of the roofing assembly of the prior Figures.

FIG. 9 is an exploded perspective view of two adjacent roofing bases.

FIGS. 14 and 15 are a cross sectional and front elevational views of a glide.

FIGS. 16 and 17 are a cross sectional and front elevational views of an eave.

The same reference numerals refer to the same parts throughout the various Figures.

DESCRIPTION OF THE PREFERRED EMBODIMENT

Figure 1:
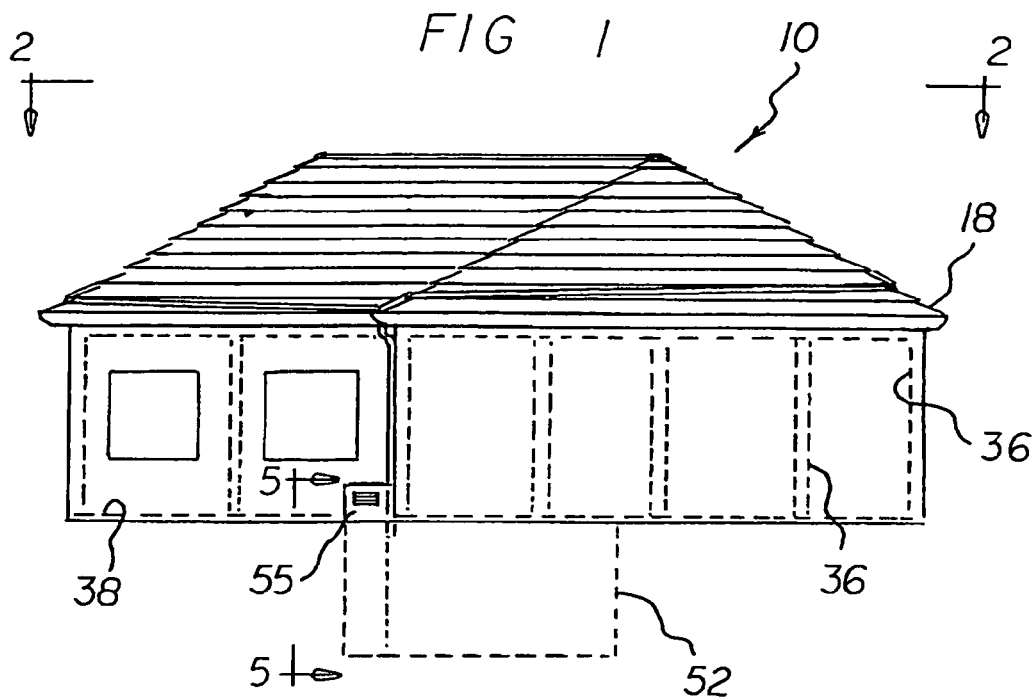
FIG. 1 is a front elevational view of a building utilizing a roofing structure constructed in accordance with the principles of the present invention.
Figure 2:
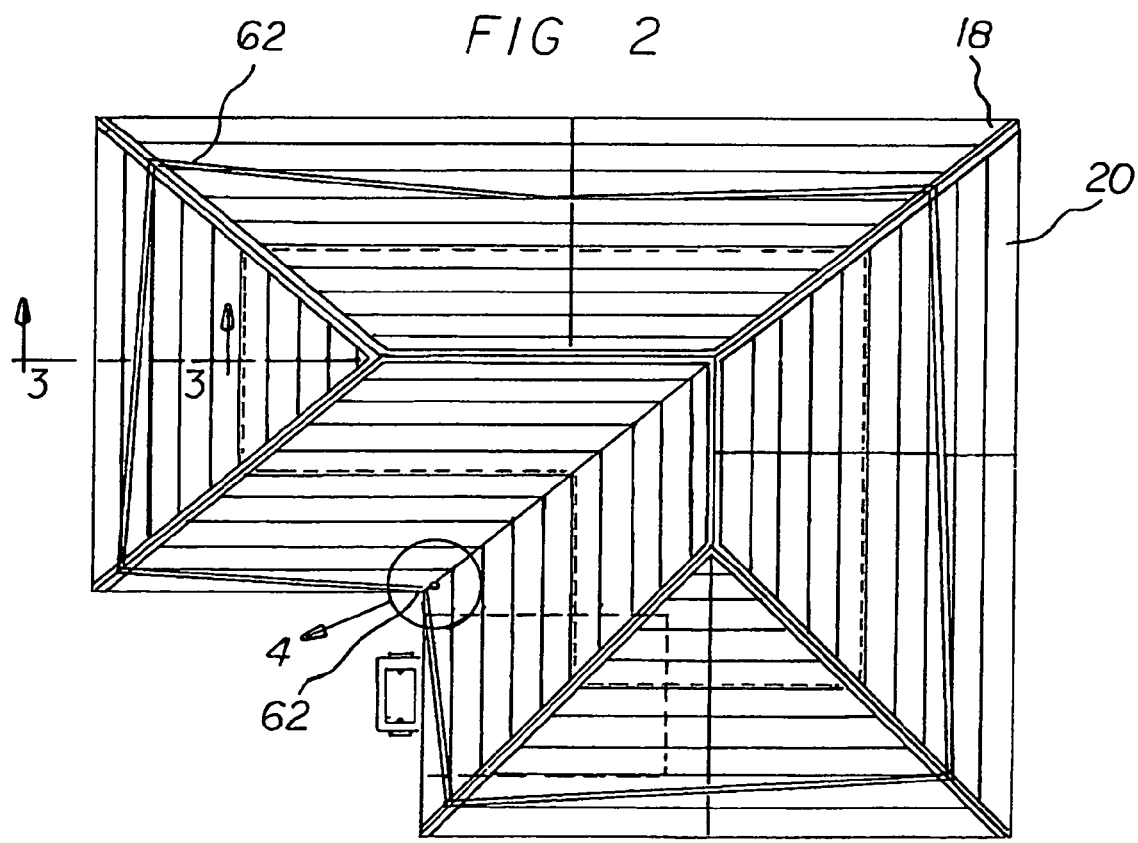
FIG. 2 is a plan view of the system taken along line 2-2 of FIG. 1.

With reference now to the drawings, and in particular to FIG. 1 thereof, the preferred embodiment of the new and improved perfect perch roofing system embodying the principles and concepts of the present invention and generally designated by the reference numeral 10 will be described.

The present invention, the perfect perch roofing system 10 is comprised of a roofing assembly. Such components are individually configured and correlated with respect to each other so as to attain the desired objective.

First provided is a concrete slab 14. The concrete slab is positionable on the ground in a horizontal plane.

A roofing assembly 18 is provided. The roofing assembly is positioned above the slab. The roofing assembly includes an uppermost stainless steel cover 20. The cover has an upper surface. The upper surface is coated with a non-skid coating 22. The cover has a lower surface. The roofing assembly includes a reinforced Styrofoam base 24. The roofing assembly includes rafters 26. The roofing assembly includes a ridge board 28. The ridge board supports the cover and the base. The roofing assembly includes Plycem cement board panels 30. The panels have upper surfaces. The upper surfaces are adhered to the Styrofoam base. The roofing assembly also includes doubling attaching members 32. The members are provided between rafters and ridge boards. In this manner fabrication and assembly are facilitated at separate sites.

An enclosing structure is provided. The enclosing structure has laterally spaced, vertically disposed concrete columns 36. Each column has a lower end. The lower end is coupled to the slab. Each column has an upper end. The upper end is coupled to the roofing assembly. The enclosing structure includes walls. The walls are supported by the columns. The enclosing structure includes peripheral footers 38. The footers couple the columns at their lower ends adjacent to the slab. The enclosing structure includes a concrete peripheral belt course 40. The belt course is coupled to the upper ends of the columns. The enclosing structure includes upstanding cast-in-place bolts 42. The bolts extend upwardly from the belt course. The enclosing structure includes a wooden wall plate 44. The wooden wall plate has several vertical apertures. The apertures receive the bolts. In this manner securement is provided. Stainless steel screws 46 are provided. The stainless steel screws secure the rafters to the wall plate. Eave molding 48 is provided. The eave molding is fabricated of Styrofoam. The eave molding is secured between the walls of the enclosing structure and the roofing assembly.

Provided last is a rain water sub-system. The rain water sub-system includes a rain water storage tank 52. The tank is positioned beneath the slab. The tank is fabricated of Styrofoam. The tank has a stainless steel casing. The tank includes a stainless steel cover. The tank has a divider 54. The divider divides the tank into two regions. A manhole 55 provides access to the tank. A debris receiving sump 56 is provided in each region. A self priming pump 58 is provided. The self priming pump removes rainwater from the tank. Rain water glides 60 are provided. The rain water glides are provided on the roof. Down pipes 62 are provided. The down pipes have filters 64, 66. The filters direct rain water from the roof to the tank.

The system of the present invention has the ability to offer an option for extremely hot climates by facilitating a pump that will keep the water flowing. That is, the water will have a continuous flow and, therefore, no stagnation. The pump can be removed easily because it is submerged from without a designated corner of the tank.

The system comprises significant structures. A stainless steel cover can be of various thicknesses, colors and finishes including non skid. Styrofoam roofing base to various profiles includes flat and traditional Bermuda profiles with rainwater glides leading to down pipes to water storage tanks with stainless steel covering and optional Styrofoam eave molding to provide a seal between the roof and walls. Plycem cement board panels are of various thicknesses and dimensions. Conventional timber roof framing is of various dimensions with double members on various rafters and ridge boards as required to suit installation and removal of damaged roofing panels. Rafters can be connected by hurricane clips to a timber wall plate. A concrete belt course has cast-in-place bolts located to match pre-drilled holes in the timber wall plate. Reinforced concrete columns with rods bent into concrete belt course are positioned and reinforced to suit the building layout. Infill and fenestration between the columns can be of materials of a designer's requirements. A reinforced floor slab has starter bars to the columns. Concrete foots are reinforced. A Styrofoam rainwater storage tank has stainless steel casing to all surfaces. The dimensions and the thickness of the Styrofoam panels, Plycem panels, roof framing and concrete placing and positioning depend on the building layout and designers' and code requirements.

The water storage tank is assembled or supplied as components for onsite assembly. The water storage tank consists of bottom, sides, tops and accesses. Styrofoam panels are bonded together with an exterior +++ coating.

FIGS. 3, 10, 12 and 13 show a Bermuda profile roof panel with stainless steel covering. The covering can be of any thickness, color and finish. The panels can be of dimensions to suit. They are to be adhered to Plycem cement board. Panels have a tongue and groove shaped end for interconnecting.

Figure 3:
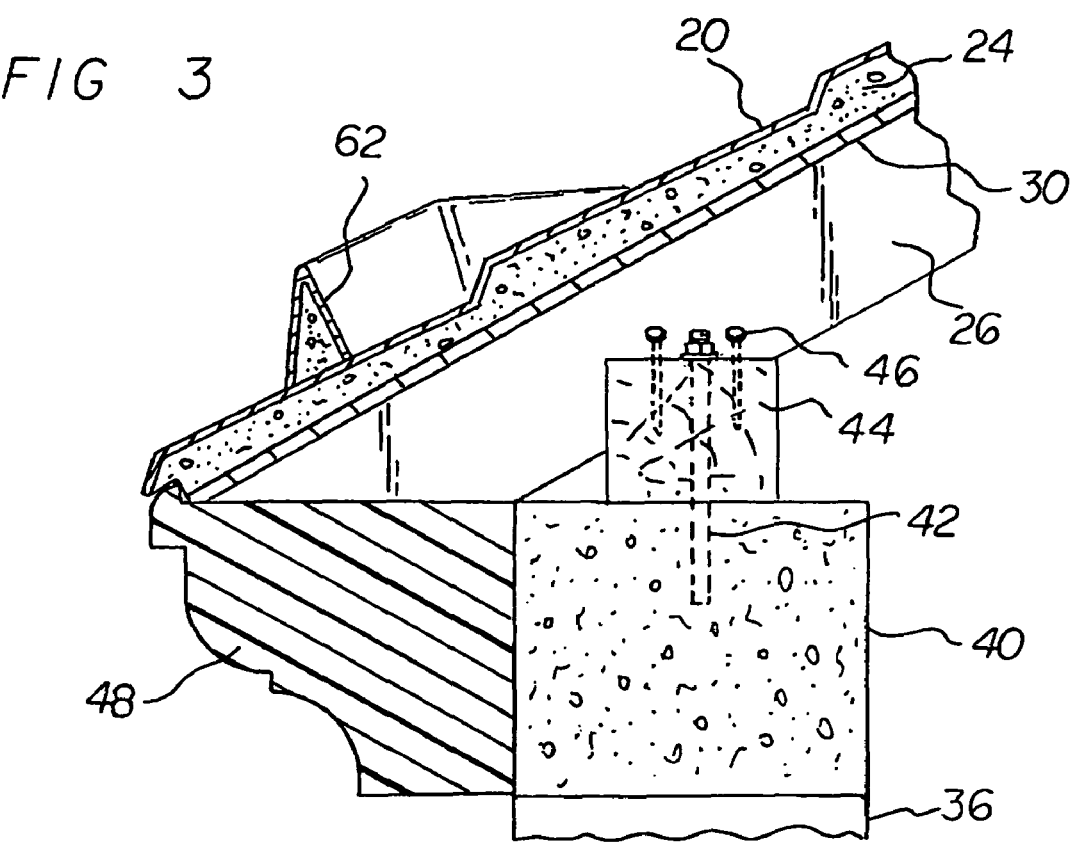
FIG. 3 is a cross sectional view taken along line 3-3 of FIG. 2.
Figure 4:
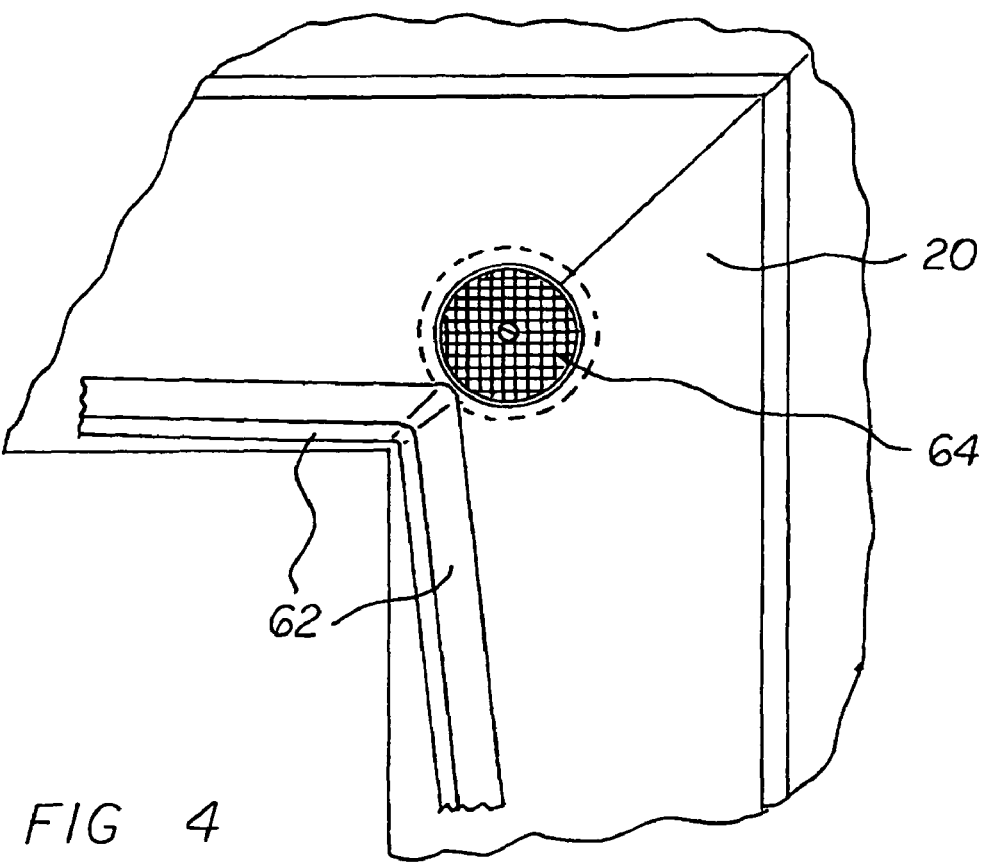
FIG. 4 is an enlarged plan view taken at Circle 4 of FIG. 2.

FIGS. 1, 3 and 8 show the roof framing detail, wall, footing and floor slab details. Sizing and reinforcing depend on the site layout and appropriate codes. Prefabricated timber roof panels consist of double ridge boards, rafters and wall plate members. The panels connect to each other at the ridge, to each other, and at the wall late to a reinforced concrete belt with cast-in-lace anchor bolts, all with pre-drilled bolt holes. Collar ties join opposite panels by field bolts. The supporting columns are spaced to suit the building layout. Infills between columns can be prefabricated with desired fenestration or by field.

FIGS. 2, 3, 14 and 15 show details of rainwater glide with appropriate finish which can be adhered to the finished roof with appropriate slopes to down pipes to a rainwater storage tank if the rainwater is to be collected and stored for domestic use.

FIG. 3 also shows an optional eave fill profile to seal the space between the underside of the installed roof and the concrete belt. It can also be provided between rafter feet if they are provided. Alternatively, plain infill can be provided. Shown also is a ridge cap to be installed above the finished roof and ridge boards.

Figure 5:
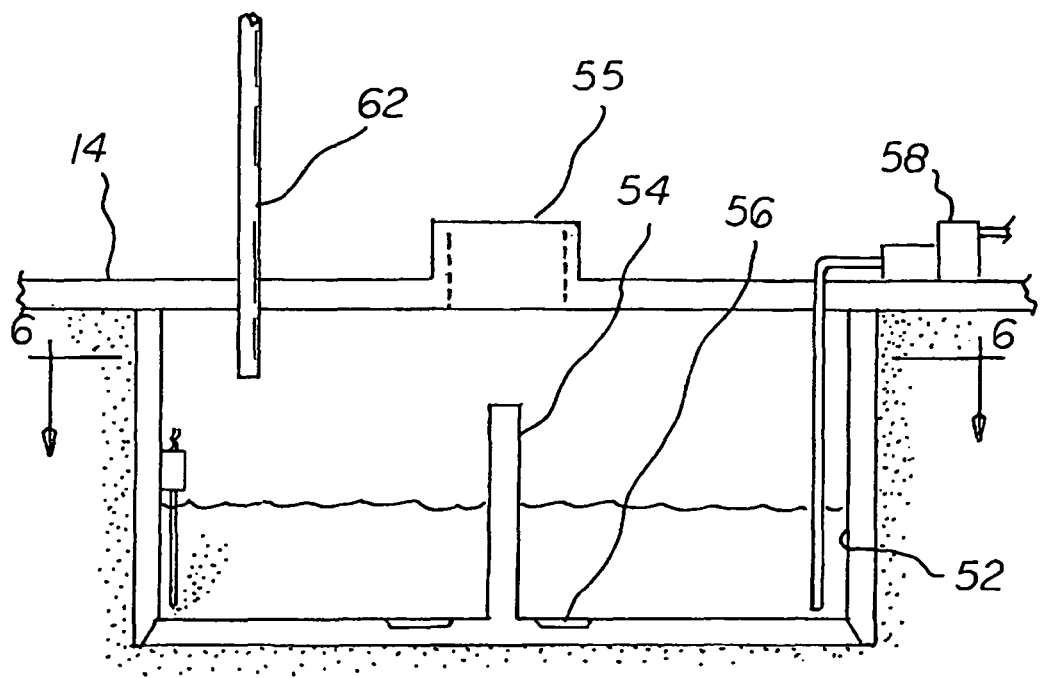
FIG. 5 is a cross sectional view taken along line 5-5 of FIG. 1.
Figure 6:
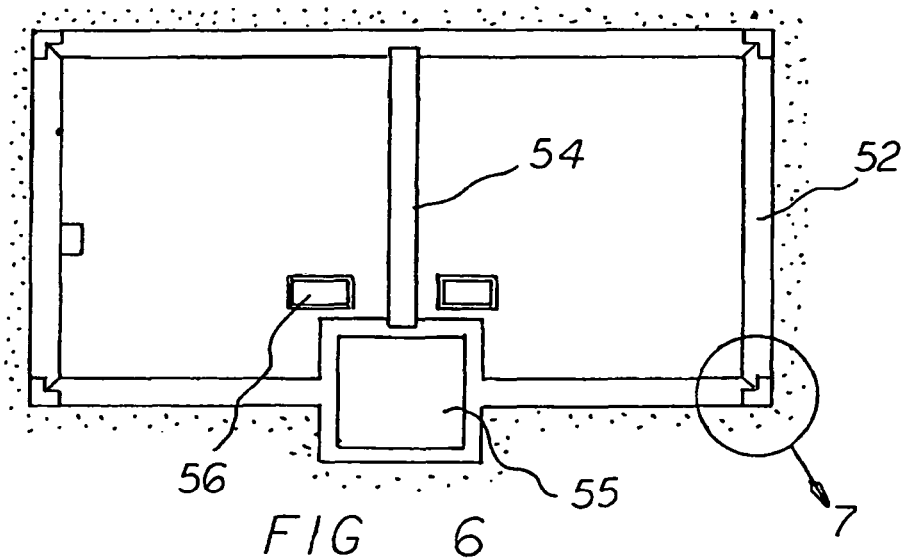
FIG. 6 is a cross sectional view taken along line 6-6 of FIG. 5.
Figure 7:
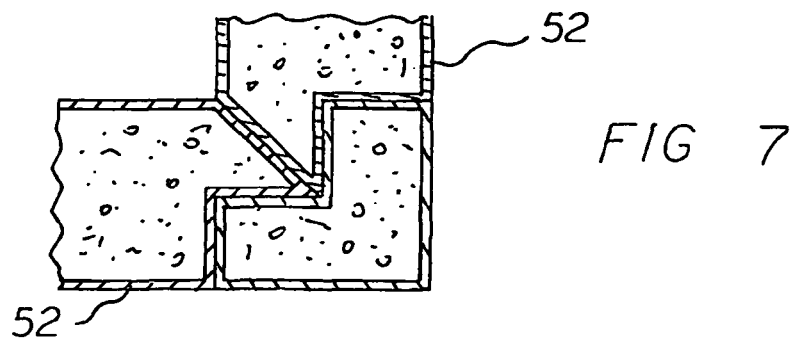
FIG. 7 is an enlarged plan view taken at Circle 7 of FIG. 6.
Figure 10:
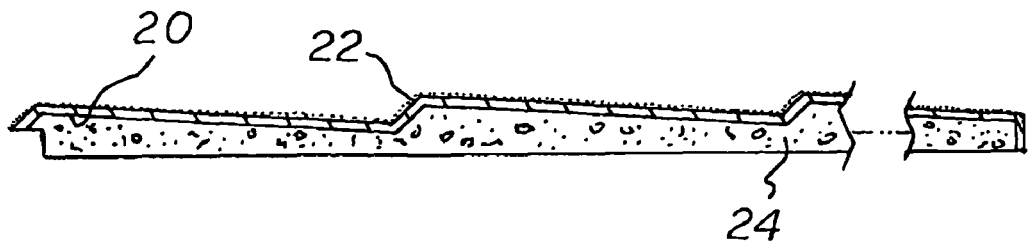
FIGS. 10 through 13 are cross sectional views of alternate embodiments of the roofing bases.
Figure 11:
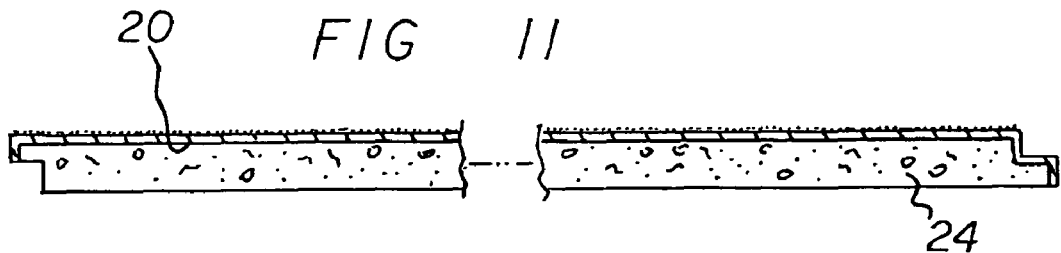
Figure 12:
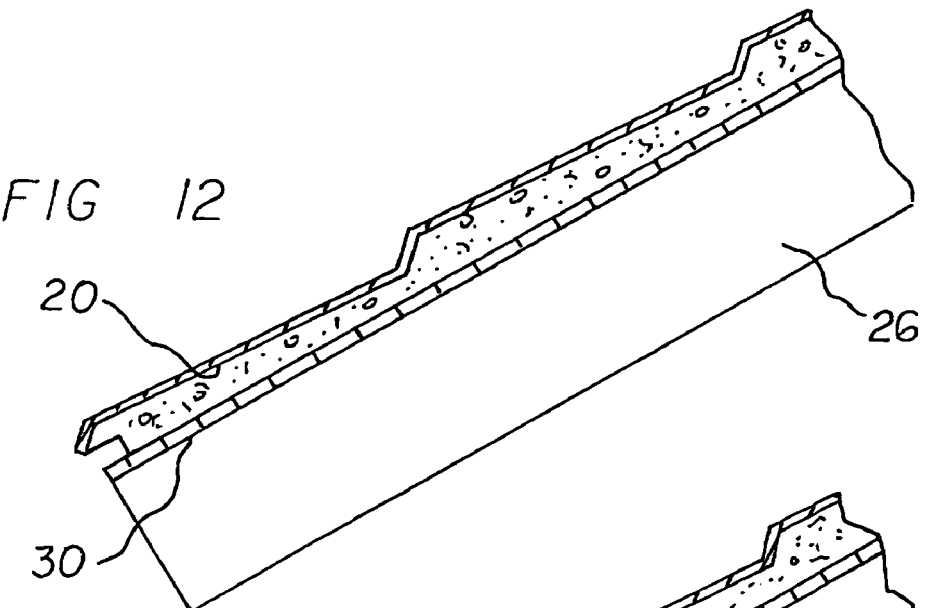
Figure 13:
Figure 18:
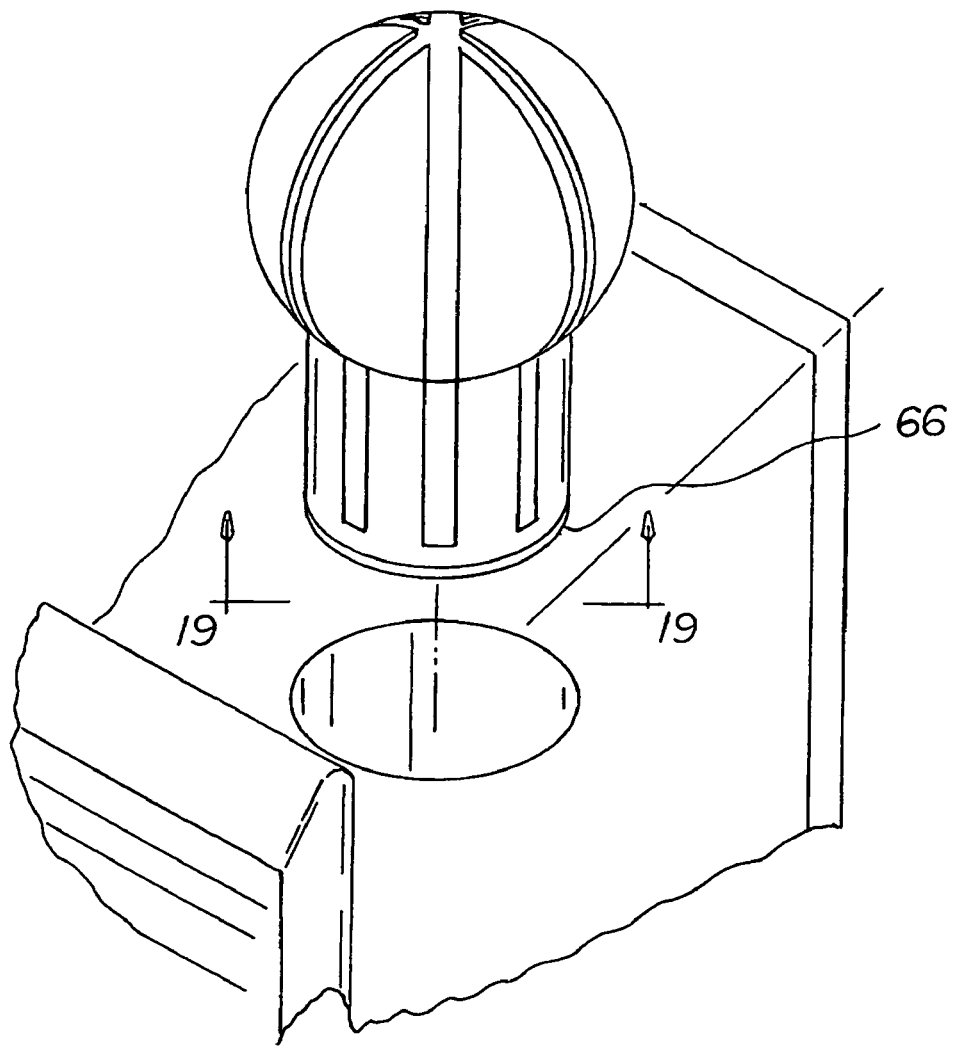
FIGS. 18 and 19 are an exploded perspective and a plan view of an alternate filter.
Figure 19:
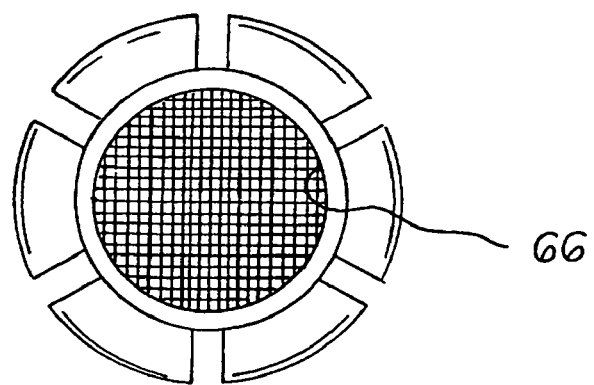

FIGS. 1, 5 and 6 show a rainwater storage tank. Features of the rainwater storage tank are a Styrofoam body with appropriate dimensions, a divide wall, sumps, an access well and a top, all encased with stainless steel. The rainwater storage tank can be prefabricated or field assembled.

FIGS. 10 through 13 show the method of joining panels whether they be sides together or to top and bottom. These consist of shaped panels with splines to tie all together.

FIG. 8 shows a typical roof framing layout. Panels are made up of a ridge board, rafters and wall plate all connected together. The ridge board connects to a ridge board of an adjacent panel and the wall plate is bolted to a bond beam on the perimeter of the building through pre-drilled holes. Collar ties are field bolted to each of the pairs of rafters. The panels can be shipped and installed prior to the installation of the Plycem and finished roof.

More significant features of the present invention are included. The composition of the perfect perch roof system makes it a truly unique system with combined attributes of safety, durability and economy. This unique roof system is safe from the normal roof damage caused by wear and tear due to a layer of stainless steel fastened onto it.

The roof is permanent because of its durable construction that will negate the costly yearly maintenance that average roofs encounter. The minimal amount of maintenance required makes the present invention most economical.

The bolting system used in the present invention renders this roof difficult to detach due to severe weather conditions, such as gale force winds, storms, hurricanes and treacherous tornados. This feature enhances the already durable roof construction.

The storage tank that catches the water from the roof is also durable and versatile. Its common sense practicality is consistent with efforts to combat global warming. These tanks can be prefabricated or field assembled. Just like the roof, the outer layers are an encasement of stainless steel while the walls are formed with Styrofoam to avoid cracks and erosion. As an added feature, the construction of the tank makes it environmentally friendly because of the protection it provides against fungi and pollutants that are associated with concrete tanks.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A perfect perch roofing system comprising:
   a roofing assembly including an uppermost stainless steel cover having an upper surface, the cover having a lower surface with a reinforced foam base, rafters and a ridge board supporting the cover and the foam base, cement board panels having upper surfaces adhered to the foam base;
   a concrete slab positionable on the ground in a horizontal plane; and
   an enclosing structure having laterally spaced, vertically disposed concrete columns, each column having a lower end coupled to the slab and an upper end coupled to the roofing assembly, the enclosing structure including walls supported by the columns, peripheral footers coupling the columns at their lower ends adjacent to the slab, a concrete peripheral belt course coupled to the upper ends of the columns with upstanding cast-in-place bolts extending upwardly from the belt course, a wooden wall plate with vertical apertures receiving the bolts for securement purposes, stainless steel screws for securing the rafters to the wall plate, eave molding fabricated of multicellular expanded synthetic resinous material secured between the walls of the enclosing structure and the roofing assembly.

2. The system as set forth in claim 1 and further including doubling attaching members between the rafters and the ridge board to facilitate fabrication and assembly at separate sites.

3. The system as set forth in claim 1 and further including a nonskid coating on the upper surface of the cover.

4. The system as set forth in claim 1 wherein the cement board panels are fiber cement building panels.

5. The system as set forth in claim 1 and further including:
   a rain water sub-system including a rain water storage tank positioned beneath the slab, the tank being fabricated of multicellular expanded synthetic resinous material with a stainless steel casing, the tank including a stainless steel cover, the tank having a divider dividing the tank into two regions with a debris receiving sump in each region, a self priming pump for removing rainwater from the tank, rain water glides on the roof and down pipes with filters for directing rain water from the roof to the tank.

6. A perfect perch roofing system for protecting a building from all weather conditions and for filling a storage tank with rain water, the protecting and filling being accomplished in a safe, convenient, durable and economical manner, the system comprising, in combination:
   a concrete slab positionable on the ground in a horizontal plane;
   a roofing assembly positioned above the slab, the roofing assembly including an uppermost stainless steel cover having an upper surface coated with a non-skid coating, the cover having a lower surface with a reinforced multicellular expanded synthetic resinous material base, rafters and a ridge board supporting the cover and the base, fiber cement building panels having upper surfaces adhered to the multicellular expanded synthetic resinous material base, doubling attaching members between rafters and ridge boards to facilitate fabrication and assembly at separate sites;
   an enclosing structure having laterally spaced, vertically disposed concrete columns, each column having a lower end coupled to the slab and an upper end coupled to the roofing assembly, the enclosing structure including walls supported by the columns, peripheral footers coupling the columns at their lower ends adjacent to the slab, a concrete peripheral belt course coupled in the upper ends of the columns with upstanding cast-in-place bolts extending upwardly from the belt course, a wooden wall plate with vertical apertures receiving the bolts for securement purposes, stainless steel screws for securing the rafters to the wall plate, eave molding fabricated of multicellular expanded synthetic resinous material secured between the walls of the enclosing structure and the roofing assembly; and
   a rain water sub-system including a rain water storage tank positioned beneath the slab, the tank being fabricated of multicellular expanded synthetic resinous material with a stainless steel casing, the tank including a stainless steel cover, the tank having a divider dividing the tank into two regions with a debris receiving sump in each region, a manhole for providing access to the tank, a self priming pump for removing rainwater from the tank, rain water glides on the roof and down pipes with filters for directing rain water from the roof to the tank.

* * * * *